3,258,419
CATALYTIC AIRBLOWN ASPHALT
Ross A. Hanson, Yorba Linda, Calif., assignor to Union Oil Company of California, Los Angeles, Calif., a corporation of California
No Drawing. Filed Mar. 25, 1963, Ser. No. 267,812
7 Claims. (Cl. 208—44)

This invention relates to the catalytic air blowing of asphalts and in particular relates to the use of a phosphoric acid and metal catalyst.

Asphalts, particularly those derived from petroleum stocks, have been air blown to impart desired physical and rheological properties and, in particular, to impart a gel-like character to the asphalt. Because of these properties, the blown asphalts have a better consistency with temperature than straight run asphalts, e.g., they have a greater resistance to flow at relatively high temperatures.

Various catalysts have been suggested to promote the air blowing of asphalt and to impart certain desired properties; see "Asphalt, Its Composition, Properties and Uses," by Ralph N. Traxler, page 128 (1961). The use of various catalysts such as ferric chloride, phosphorus pentoxide, etc., is advantageous as these catalysts generally provide a greater increase in viscosity upon air blowing for a given penetration value than obtained without the use of the catalysts. High viscosities are necessary prerequisites for paving asphalts to avoid "tender" pavements, a susceptibility of low viscosity asphalts to exhibit severe tire markings. Accordingly, it is desirable to provide a minimum viscosity of paving asphalts greater than about 150 seconds S.S.F. at 275° F. in the 85–100 penetration grade and at least about 230 seconds in the 40–50 penetration grade.

While the use of various prior art suggested catalysts for the air blowing of petroleum asphalts permits high viscosities to be achieved in the aforecited penetration grades, the ductility of the product is often impaired. Specifically, the use of various metal catalysts such as ferric chloride, etc. and the use of various phosphorus compounds such as phosphorus pentoxide, orthophosphoric acid, etc., markedly decrease the ductility of the asphalt when employed to air blow the asphalt to the aforecited minimum viscosity grade.

I have now discovered that the desirable high viscosity and penetration values can be achieved by air blowing petroleum asphalt in the presence of various metal phosphates and phosphoric acid. Specifically, I have found that the use of wet process phosphoric acid, which contains incidentally dissolved metals, as a catalyst in the air blowing of petroleum asphalt achieves the desired viscosity and penetration properties while retaining a high ductility in the product. This result was entirely unexpected and surprising since the use of relatively pure orthophosphoric acid or phosphorus pentoxide as suggested by the prior art and/or the use of metal salts for such purpose greatly impairs the ductility of the asphalt product.

As previously mentioned, the catalyst employed in my invention comprises phosphoric acid containing various dissolved metals. In general, the phosphoric acid comprises orthophosphoric acid which has a concentration, expressed as weight percent $P_2O_5$ on an impurity free basis, between about 25 and about 69 weight percent. Such acid contains between about 36 and about 100 percent orthophosphoric acid on an impurity and additive free basis. The metal oxides are present in such acid in amounts comprising about 1 and about 15 weight percent (calculated as the oxides). In general, the acid can contain any of the following dissolved metals or mixtures thereof: aluminum, iron, magnesium, zinc, chromium, vanadium, titanium, copper, cobalt, manganese, etc.

A preferred catalyst for my air blowing of asphalt comprises the various commercially available wet process phosphoric acid. Such acids are manufactured by a process which, in essence, consists of treating phosphate rock (essentially calcium phosphate) with a mineral acid such as sulfuric, nitric, etc., whereby there is formed free phosphoric acid and calcium sulfate. The latter, being insoluble, is separated from the acid by filtration. The resultant phosphoric acid is a highly impure material, dark in color and containing relatively large amounts, between about 0.5 and about 15 weight percent, of dissolved metal impurities leached from the rock including aluminum, magnesium, iron, zinc, copper, vanadium, etc. Also present are slight amounts of sulfates, fluorides, silicates, and, frequently, organic material. A complete description of such acid and the processes by which it is made are set forth in "Phosphoric Acid, Phosphates and Phosphate Fertilizers," by W. H. Waggaman, 2nd edition, pages 174–208 (Rheinhold Publishing Corporation, 1952). Such acid is available in both dilute and "concentrated" forms, containing about 25–35 and about 35–55 weight percent phosphorus expressed as $P_2O_5$, respectively, and either concentration may be employed. The following table summarizes the compositions of various commercially available wet process phosphoric acids:

TABLE 1

|  | A | B | C | D | E |
|---|---|---|---|---|---|
| Percent: | | | | | |
| $P_2O_5$ | 52.6 | 54.5 | 50.6 | 54.4 | 27.2 |
| F | 0.9 | 0.3 | 0.9 | 1.1 | 0.8 |
| S (as $SO_3$) | 2.6 | 2.0 | 0.9 | 1.9 | 1.0 |
| Fe | 1.0 | 1.4 | 0.8 | 1.9 | 0.8 |
| Al | 1.9 | 0.6 | 1.4 | 1.9 | 1.0 |
| Mg | 0.8 | 0.5 | 0.4 | 0.1 | |
| V | 0.6 | | 0.2 | | |
| Zn | 0.6 | | 0.1 | | |
| Ti | 0.6 | | | | |
| Cr | 0.1 | | 0.2 | | |
| Mn | 0.1 | | | | 0.1 |

Metals calculated as their oxides.

If desired, the amount of dissolved metals in such wet process phosphoric acid can be increased by the addition thereto of soluble salts of any of the aforementioned metals.

The amount of catalyst employed in the air blowing in general comprises between about 0.05 and about 3.0 weight percent phosphorus expressed as $P_2O_5$ based on the amount of asphalt oxidized. Preferably, between about 0.1 and about 1.5 weight percent is employed.

The air blowing is generally applicable to all petroleum asphalts including the various conventional vacuum reduced or steam distilled residua derived from the refining of asphaltic crudes. In general, such residua are obtained by the steam atmospheric distillation or distillation at about 10 to about 300 millimeters mercury. Frequently, the crude is desalted prior to processing and such desalting is desirable since it prevents the salt contamination of the asphalt product. The asphalt can also be obtained by suitable solvent deasphalting treatments of asphaltic crudes or residua, e.g., propane deasphalting, Duosol treatment, furfural extraction, etc.

As conventional in the production of asphalt from petroleum stocks, the material subjected to air blowing can be a blend of various of the aforementioned petroleum fractions and residua to impart the desired physical, colloidal and rheological properties to the final product. Frequently, the asphalt containing residua can be blended with a lighter petroleum distillate such as a heavy gas oil obtained in the vacuum distillation.

In general, the air blowing of petroleum asphalts is performed by charging the stock to a vessel, heating the stock to the desired temperature and thereafter introducing an oxygen containing gas into contact with the asphalt. In general, temperatures between about 375° and about 600° F. can be employed, preferably temperatures between 400° and about 550° F. are employed; most preferably, between about 450° and about 525° F. are used.

An oxygen containing gas, preferably air or mixtures of air with added oxygen or an inert diluent as desired, are employed. Various inert diluents such as nitrogen, carbon dioxide, etc., can be employed to provide a gas containing between about 10 and about 40, preferably about 20 volume percent oxygen.

The oxygen containing gas, preferably air, is introduced at a rate between about 0.5 and about 10 standard cubic feet per minute per barrel of asphalt; preferably between about 1 and about 5; most preferably between about 1 and about 3 cubic feet per minute per barrel are employed.

The time of the air blowing can be varied considerably depending upon the desired properties and the severity of the other variables, temperature and air rate. In general, however, time periods between about 0.5 and about 10 hours are employed; between about 1 and about 5 hours are preferred; between about 1 and about 3 hours are most preferred for the separation of suitable paving materials.

The air blowing process can be followed and readily controlled by periodic sampling of the asphalt and routinely performing a simple laboratory inspection of the product for properties such as softening point, penetration and/or viscosity. If desired, a portion of the material can be withdrawn and passed through a suitable flow meter, e.g., orifice plate, and a temperature recording instrument. From the known temperature-viscosity correlation of the stock, the extend of air blowing can be immediately determined and the process controlled in response to such determination.

The air oxidation can be employed under batch or continuous operations. In general, batch operations are quite commonly employed for the air blowing of asphalt because of the diverse product properties desired. When a single type of product is to be made, however, continuous units can be employed which can be directly incorporated into the refining equipment, e.g., the vacuum tower bottoms can be discharged directly into a continuous air blowing still.

The asphalt stock is charged to an oxidizing tower, generally a vertically disposed vessel which has air introduction means positioned in its lower extremity and which can also have facilities for controlling the temperature of the asphalt during oxidation. Examples of such control means can be heat exchanged surfaces disposed within the oxidizing tower or a pump to circulate the asphalt through an external heat exchange and a return line to the oxidizing tower, or when necessary, cooling can be obtained by spraying water onto the surface of the asphalt in the tower or by injecting water through the air inlet spider. Mechanical means to agitate the asphalt during oxidation can be employed if desired, however, sufficient agitation can usually be secured by properly distributing air flow into the oxidizing tower. In this respect, vertically disposed oxidizing towers are preferred to horizontal vessels to prolong the contact between the air stream and the asphalt.

The catalyst can be introduced into the oxidizing tower in various methods, it can be introduced with the asphalt feed or separately introduced into the tower. Preferably, the catalyst is intimately admixed with the asphalt by controlled addition of the catalyst to the oxidizing tower during addition of the asphalt or by controlled addition of the catalyst to the asphalt stream while it is being introduced into the tower.

The following will illustrate a mode of practicing my invention.

*Examples 1 to 4*

The air blowing of asphalt was performed on a laboratory scale with a 4-inch diameter vessel 20½ feet in height. The vessel was not insulated and an electrical resistance heater was wrapped around the vessel to maintain the reactor at the desired temperature. Air was introduced into a gas distributor at the base of the vessel to effect the oxidation.

An asphalt blend was prepared comprising the vacuum residua of a Los Angeles Basin crude and between about 20 and about 35 weight percent of a vacuum reduced Kuwait crude. To 95 parts of this blend were added 5 parts by weight of a vacuum tower gas oil having an initial boiling point of about 350° F. at 1.0 millimeter mercury. The resultant blend had a penetration between about 60 and 70 and a softening point of about 118° F. When employed, the catalyst was added to the asphalt and the latter heated to the desired reaction temperature. Varied air rates were employed for varied time periods and the products having characteristics set forth in Table 2 were obtained under each of the specified conditions.

TABLE 2

| Ex. | Catalyst | Temperature, °F. | Air Rate [1] | Time, hours | Penetration [2] | Softening Point, [3] °F. | Viscosity S.S.F./275° F., seconds |
|---|---|---|---|---|---|---|---|
| 1a | None | 450 | 2 | 0.5 | 44 | 129 | 186 |
| 1b | ----do---- | 450 | 2 | 1.0 | 36 | 131 | 214 |
| 2a | 1% Acid C [4] | 450 | 2 | 0.5 | 53 | 124 | 208 |
| 2b | ----do---- | 450 | 2 | 1.0 | 44 | 127 | 248 |
| 2c | ----do---- | 450 | 2 | 1.5 | 38 | 132 | 319 |
| 3a | 0.5% $P_2O_5$ | 450 | 2 | 0.5 | 52 | 124 | 199 |
| 3b | 0.5% $P_2O_5$ | 450 | 2 | 1.0 | 45 | 127 | 224 |
| 4a | 1.0% $P_2O_5$ | 450 | 2 | 0.5 | 44 | 129 | 279 |
| 4b | 1.0% $P_2O_5$ | 450 | 2 | 1.0 | 40 | 133 | 322 |

[1] Air rate in standard cubic feet per barrel of asphalt.
[2] ASTM D-5-59t, expressed in tenths of millimeters.
[3] ASTM E-28-58t.
[4] The wet process phosphoric acid reported as Acid C in Table 1 was used.

The preceding results demonstrate that the uncatalyzed air blowing of the asphalt stock can not provide a product having a minimum viscosity of 230 SSF at 275° F. within the 40–50 penetration grade. Example 2 demonstrates that the desired properties can be obtained by air blowing such asphalt stock in the presence of 1 weight percent of a wet process phosphoric acid comprising orthophosphoric acid and the aforementioned metal salts.

Example 3 illustrates that the addition of ½ weight percent $P_2O_5$ to the asphalt during the air blowing operation permits one to achieve a sufficient viscosity increase and meet the viscosity penetration requirements.

The asphalt products obtained in Examples 1 through 4 were then evaluated for ductility after a thin film oven test as specified by the American Association of State Highway Engineers, T 178–57. The oven test simulates the conditions to which the asphalt is subjected during hot plant mixing for preparation of asphalt aggregates. In this test, a 50 gram sample of the asphalt is poured into a tared 5.5 inch diameter pan and heated at 325° F. in an oven with a rotating circular shelf. After 5 hours in the oven, the asphalt residue is removed and tested by a standard ductility test according to the procedure set forth in ASTM D11-44. The results of the ductility test appear in Table 3.

TABLE 3

| Example | Catalyst | Ductility of Residue From Thin Film Oven Test, centimeters |
|---|---|---|
| 1a | None | 150+ |
| 1b | do | 11 |
| 2a | 1% Acid C | 150+ |
| 2b | do | 150+ |
| 2c | do | 72 |
| 3a | 0.5% $P_2O_5$ | 150+ |
| 3b | 0.5% $P_2O_5$ | 126 |
| 4a | 1.0% $P_2O_5$ | 139 |
| 4b | 1.0% $P_2O_5$ | 66 |

The ductility results indicate that the uncatalyzed air blowing of the asphalt stock results in a marked decrease in ductility; Example 1B. The use of $P_2O_5$ to catalyze the air blowing improved the ductility somewhat, see Examples 3 and 4; however, in no instance was it possible to obtain a product having a viscosity above the minimum of 230 SSF while retaining the original 150+ ductility. Sample 4a had the highest ductility of the $P_2O_5$ catalyzed asphalts having satisfactory penetration and viscosity; this ductility was 139.

Example 2b indicates that the air blowing of the asphalt stock for 1 hour at 450° F. in the presence of 1 weight percent of the wet process phosphoric acid achieved the necessary viscosity penetration and ductility properties. The prolonged blowing of this material, however, reduced its ductility; Example 2c.

Examples 5 to 9

A second blended asphalt charge stock was prepared by blending the aforementioned mixture of Los Angeles Basin residua and Kuwait residua with the vacuum tower gas oil in 9:1 proportions of the asphalt mixture and the gas oil, respectively. The resultant blend had a penetration between about 70 and about 90 and a softening point of about 114° F. The material was charged to the aforedescribed air blowing apparatus and subjected therein to air blowing conditions set forth in Table 4. The properties of the product obtained under these conditions are also set forth.

TABLE 4

| Ex. | Catalyst | Temperature, °F. | Air Rate [1] | Time, hours | Penetration [2] | Softening Point, [3] °F. | Viscosity SSF/275° F., seconds |
|---|---|---|---|---|---|---|---|
| 5a | None | 450 | 2 | 0.5 | 77 | 118 | 120 |
| 5b | do | 450 | 2 | 1.0 | 60 | 123 | 149 |
| 5c | do | 450 | 2 | 1.5 | 48 | 128 | 191 |
| 6a | 1% Acid C[4] | 450 | 2 | 1.0 | 59 | 119 | 185 |
| 6b | do | 450 | 2 | 1.5 | 51 | 125 | 230 |
| 7a | 0.7% pure $H_3PO_4$ | 450 | 2 | 1.5 | 47 | 127 | 265 |
| 7b | do | 450 | 2 | 1.8 | 43 | 129 | 302 |
| 8a | 0.5% $P_2O_5$ | 450 | 2 | 1.0 | 44 | 133 | 275 |
| 8b | 0.5% $P_2O_5$ | 450 | 2 | 1.5 | 39 | 136 | 327 |
| 9a | 0.2% $FeCl_3$ | 450 | 2 | 0.5 | 54 | 126 | 187 |
| 9b | 0.2% $FeCl_3$ | 450 | 2 | 1.0 | 42 | 131 | 248 |
| 9c | 0.2% $FeCl_3$ | 450 | 2 | 1.5 | 33 | 138 | 343 |

[1] Air rate in standard cubic feet per barrel of asphalt.
[2] ASTM D-5-59t, expressed in tenths of millimeters.
[3] ASTM E-28-58t.
[4] The wet process phosphoric acid reported as Acid C in Table 1 was used.

The preceding data demonstrate that the uncatalized air blowing of the asphalt stock does not provide a material having the necessary viscosity and penetration properties. Satisfactory viscosity and penetration properties can be achieved with the addition of various catalysts including wet process phosphoric acid, pure orthophosphoric acid, phosphorus pentoxide and ferric chloride, however, the following test demonstrates that only the wet process acid catalyzed product retained its high ductility.

The products obtained in these examples were therefore subjected to the aforedescribed thin film oven test and the residue so obtained were subjected to the ASTM ductility test. The results appear in Table 5:

TABLE 5

| Example | Catalyst | Ductility, centimeters |
|---|---|---|
| 5a | None | 150+ |
| 5b | do | 150+ |
| 5c | do | 87 |
| 6a | 1% Acid C | 150+ |
| 6b | do | 120 |
| 7a | 0.7% $H_3PO_4$ (pure) | 67 |
| 7b | 0.7% $H_3PO_4$ (pure) | 43 |
| 8a | 0.5% $P_2O_5$ | 34 |
| 8b | 0.5% $P_2O_5$ | 46 |
| 9a | 0.2% $FeCl_3$ | 64 |
| 9b | 0.2% $FeCl_3$ | 12 |
| 9c | 0.2% $FeCl_3$ | 15 |

The preceding data demonstrate that the uncatalyzed air blowing of the asphalt stock results in a ductility decrease. With this particular stock, however, the addition of various prior art suggested catalysts such as pure orthophosphoric acid, Example 7; phosphorus pentoxide, Example 8; and ferric chloride, Example 9; resulted in a much greater decrease in ductility upon air blowing than the uncatalyzed air blowing. The data obtained with Example 6, however, demonstrate that the use of wet process phosphoric acid which comprises essentially a mixture of orthophosphoric acid and about 3 weight percent dissolved metals achieves the desired viscosity and penetration properties while substantially retaining a high ductility.

The preceding examples are not intended to unduly limit my invention but are intended solely as illustrative of a mode of practicing the invention and demonstrative of the results obtainable therewith. While my invention has been illustrated in regard to the manufacture of a paving asphalt with a penetration between about 40 and 50, the invention is equally applicable to achieving a necessary viscosity increase while retaining ductility in other conventional penetration grades of asphalt such as the 50-60, 85-100, 120-200, and 200-300 penetration grades.

Having set forth a detailed description of my invention including the manner and process of making and using same, I intend that the invention shall be clearly and concisely defined by the method steps and their equivalents set forth in the following claims.

I claim:

1. The method of increasing the viscosity while retaining the ductility of a high molecular weight petroleum hydrocarbon which comprises contacting said high molecular weight petrolum hydrocarbon with oxygen in the presence of a catalyst comprising phosphoric acid that contains from 1 to about 15 percent by weight of dissolved aluminum and iron salts (calculated as oxides).

2. The method of claim 1 wherein the temperature of said contacting is performed at a temperature between about 400° and about 575° F.

3. The method of claim 1 wherein said catalyst comprises a wet process phosphoric acid.

4. The process of claim 1 wherein the air blowing is conducted at a temperature between about 400° and about 575° F., at an air rate between about 1 and about 10 standard cubic feet per minute per barrel of said petroleum hydrocarbon and at a period of time between about 0.5 and about 10 hours.

5. In the manufacture of a paving asphalt by the air blowing of a high molecular weight petroleum hydrocarbon and wherein the desired increase in viscosity upon air blowing is normally accompanied by an undesired decrease in ductility of the product, the improved method of achieving the desired viscosity and avoiding said undesired decrease in ductility and thereby producing an asphalt of improved properties which comprises incorporating in said petroleum hydrocarbon during said air blowing a catalyst comprising phorphoric acid and between about 1 and about 15 weight percent of dissolved iron and aluminum salts (calculated as the oxides).

6. The method of claim 5 wherein said air blowing is performed at temperature between about 400° and about 575° F. and at air rates between about 1 and about 10 standard cubic feet per minute per barrel of said petroleum hydrocarbon.

7. The manufacture of a paving grade of asphalt which comprises contacting an asphaltic petroleum hydrocarbon stock with an oxygen containing gas at a temperature between about 400° and about 575° F. and in the presence of between about 0.05 and about 3.0 weight percent of a catalyst comprising a mixture of phosphoric acid that contains from 1 to about 15 weight percent of dissolved salt of aluminum and iron (calculated as the oxides).

References Cited by the Examiner
UNITED STATES PATENTS

| | | | |
|---|---|---|---|
| 2,179,208 | 11/1939 | Burk et al. | 208—4 |
| 2,762,755 | 9/1956 | Kinnaird | 208—6 |
| 2,906,687 | 9/1959 | Roediger et al. | 208—6 |
| 3,044,851 | 7/1962 | Young | 208—107 |

DANIEL E. WYMAN, *Primary Examiner.*

ALPHONSO D. SULLIVAN, *Examiner.*

H. LEVINE, P. E. KONOPKA, *Assistant Examiners.*